US006714826B1

(12) United States Patent
Curley et al.

(10) Patent No.: US 6,714,826 B1
(45) Date of Patent: Mar. 30, 2004

(54) FACILITY FOR SIMULTANEOUSLY OUTPUTTING BOTH A MIXED DIGITAL AUDIO SIGNAL AND AN UNMIXED DIGITAL AUDIO SIGNAL MULTIPLE CONCURRENTLY RECEIVED STREAMS OF DIGITAL AUDIO DATA

(75) Inventors: Lawrence D. Curley, Endwell, NY (US); James F. Driftmyer, Endwell, NY (US); Eric M. Foster, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/524,461

(22) Filed: Mar. 13, 2000

(51) Int. Cl.[7] .............................................. G06F 17/00
(52) U.S. Cl. .......................................... 700/94; 725/131
(58) Field of Search ........................... 700/94; 381/119, 381/27; 369/4; 725/131, 133, 139, 141, 151, 153; 348/565, 484, 485

(56) References Cited

U.S. PATENT DOCUMENTS

| | | | | | |
|---|---|---|---|---|---|
| 4,603,417 | A | | 7/1986 | Shirasu et al. | 370/62 |
| 4,606,021 | A | | 8/1986 | Wurst | 370/62 |
| 4,648,089 | A | | 3/1987 | Hsing | 370/62 |
| 4,831,618 | A | * | 5/1989 | Bruce | 370/62 |
| 4,856,064 | A | * | 8/1989 | Iwamatsu | 381/1 |
| 5,170,252 | A | | 12/1992 | Gear et al. | 358/181 |
| 5,297,209 | A | * | 3/1994 | Kowaki | 381/10 |
| 5,483,528 | A | | 1/1996 | Christensen | 370/62 |
| 5,539,741 | A | | 7/1996 | Barraclough et al. | 370/62 |
| 5,703,794 | A | | 12/1997 | Heddle et al. | 364/514 R |
| 5,768,126 | A | | 6/1998 | Frederick | 364/400.01 |
| 5,774,567 | A | * | 6/1998 | Heyl | 381/119 |
| 5,835,033 | A | * | 11/1998 | Mita | 341/63 |
| 5,963,153 | A | | 10/1999 | Rosefield et al. | 341/61 |
| 6,298,091 | B1 | * | 10/2001 | Buerkle et al. | 375/253 |
| 6,519,344 | B1 | * | 2/2003 | Yajima et al. | 381/103 |

FOREIGN PATENT DOCUMENTS

| | | |
|---|---|---|
| EP | 0817045 A2 | 1/1998 |

OTHER PUBLICATIONS

IBM Technical Disclosure Bulletin, "Resource Management System for Multimedia Devices", Vol 36, No. 9B, (Sep., 1993), pp. 525–529.

* cited by examiner

*Primary Examiner*—Duc Nguyen
*Assistant Examiner*—Lun-See Lao
(74) *Attorney, Agent, or Firm*—William H. Steinberg, Esq.; Kevin P. Radigan, Esq.; Heslin Rothenberg Farley & Mesiti P.C.

(57) ABSTRACT

A processing facility is provided for simultaneously receiving multiple streams of digital audio data and based thereon concurrently outputting both an unmixed digital audio signal and a mixed digital audio signal. The processing facility can be implemented, for example, within an audio decoder of a set top box. The facility includes receiving a first stream of digital audio data and a second stream of digital audio data, and outputting the first stream of digital audio data as an unmixed digital audio signal. Simultaneous therewith, the first stream of digital audio data and the second stream of digital audio data are digitally mixed and outputted as a mixed digital audio signal. If necessary, the second stream of digital audio data is redigitized based on a sample frequency of the first stream of digital audio data, and either or both the first stream and second stream of digital audio data are decoded prior to mixing.

49 Claims, 5 Drawing Sheets

FACILITY FOR SIMULTANEOUSLY OUTPUTTING BOTH A MIXED DIGITAL AUDIO SIGNAL AND AN UNMIXED DIGITAL AUDIO SIGNAL MULTIPLE CONCURRENTLY RECEIVED STREAMS OF DIGITAL AUDIO DATA

CROSS-REFERENCE TO RELATED APPLICATIONS

This application contains subject matter which is related to the subject matter of the following applications, each of which is assigned to the same assignee as this application and each of which is hereby incorporated herein by reference in its entirety:

"Method To Play Audio And Video Clips Through MPEG Decoders," Ser. No. 09/046,283, filed Mar. 23, 1998; and "System And Method For Merging Multiple Audio Streams," Ser. No. 09/273,919, filed Mar. 22, 1999.

TECHNICAL FIELD

The present invention relates generally to digital data decoding systems, and more particularly, to a processing facility capable of receiving multiple concurrent streams of digital audio data and simultaneously outputting therefrom both a mixed digital audio signal and an unmixed digital audio signal.

BACKGROUND OF THE INVENTION

Full motion video and audio displays based on digital signals have become widely available. While these displays have many advantages, they also often require a massive amount of raw digital data. Because the storage and transmission of digital video and audio signals is central to many applications, and because an uncompressed representation of a video and audio signal requires a large amount of storage, the use of digital compression techniques is vital to this advancing art.

Several international standards for the compression of digital video and audio signals have emerged over the past decade, with more currently under development. These standards apply to algorithms for the transmission and storage of compressed digital data in a variety of applications, including: video-telephony and teleconferencing; high quality digital television transmission on coaxial and fiberoptic networks; as well as broadcast terrestrially and other direct broadcast satellites; and in interactive multimedia products on CD-ROM, digital audio tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 Standards. The MPEG algorithms have been developed by the Moving Picture Experts Group (MPEG), part of a joint technical committee of the International Standards Organization (ISO) and the International Electro-technical Commission (IEC). The MPEG Committee has been developing standards for the multiplex, compressed representation of video and associated audio signals.

Briefly summarized, the MPEG-2 standard describes an encoding method that results in substantial bandwidth reduction by a subjective lossy compression followed by a lossless compression. The encoded, compressed digital data is subsequently decompressed and decoded in an MPEG-2 compliant decoder.

Video and audio decoding in accordance with the MPEG-2 standard is described in greater detail in commonly assigned U.S. Pat. No. 5,576,765, entitled "Video Decoder", which is hereby incorporated herein in its entirety, as well as the above-incorporated, commonly assigned pending application Ser. No. 09/046,283, entitled "Method To Play Audio And Video Clips Through MPEG Decoders".

Audio/video decoders are typically embodied as general or special purpose processors and memory. Decoders that are used with television sets are often referred to in the industry as set-top box (STB) systems.

Stand-alone audio/video decoders currently used in STB systems generally utilize a dedicated interface to a specific transport chip and/or network interface module (NIM). As the required utility of these STB systems expands, it is becoming desirable to adopt input from various sources in addition to the base network (e.g., cable/satellite) connection.

For example, in addition to a main audio stream, such as a soundtrack for a movie, it may be desirable for the transport stream carrying the program to also contain a secondary audio stream or channel that provides, e.g., additional narrative for disabled viewers who are unable to hear subtle sounds in the original soundtrack. Alternatively, it may be desirable to allow a user to run other functions in the background and request audio queues when certain events have occurred, such as receiving mail, etc. Further, it may be desirable to allow an internet browser or other interactive application to run in the foreground, with primary audio and video programming (e.g., a movie) running in a window on the display. In such cases, it is desirable that the secondary or supplementary audio sound be mixed with the original audio stream so that both can be heard at a single time through a common set of speakers, as opposed to mixing the two streams where only one or the other is heard.

As an additional consideration, in order to accomplish decoding of multiple audio streams, the base audio decoder would conventionally be replicated for as many digital audio streams as output is desired. However, this could be costly and unnecessary in many potential audio mixing applications such as those noted above.

Therefore, in order to establish commercial advantage, there is a need for an integrated device capable of decoding and merging multiple independent digital audio streams using a single audio decode facility. The present invention is directed to meeting this need, as well as others described herein.

DISCLOSURE OF THE INVENTION

In set top boxes, there is an increasing need to be able to play multiple audio streams concurrently by mixing two streams together to a single composite output. As a further example, message overlays can be used when web browsing, while simultaneously watching either a program or listening to other audio content. Service providers are requiring this support for their designs.

Existing solutions have focused on combining the audio streams in the analog domain after decoding and digital to analog conversion. One technique for analog mixing is described in the above-referenced patent application entitled "System And Method For Merging Multiple Audio Streams." However, recognized herein is a need for a facility for digitally processing multiple streams of audio data, and for simultaneously outputting of both a mixed digital audio signal and an unmixed digital audio signal, for example, for simultaneous listening and taping, respectively.

Briefly summarized, therefore, the present invention meets these needs by providing a method for processing digital audio data which includes: receiving a first stream of digital audio data and a second stream of digital audio data; outputting the first stream of digital audio data as an unmixed digital audio signal; and digitally mixing the first stream of digital audio data and the second stream of digital audio data and outputting based thereon a mixed digital audio signal, wherein the mixed digital audio signal is output concurrent with output of the unmixed digital audio signal.

In enhanced aspects, the method includes concurrently receiving into an audio decoder the first and second streams of digital audio data through dedicated real time interfaces, wherein the audio decoder decodes at least one of the first stream of digital audio data and the second stream of digital audio data. Further, if digitized at different rates, resampling of the second stream of audio data can occur based on a sample frequency of the first stream of digital audio data. Also, n additional streams of digital audio data, wherein $n \geqq 1$, can be received and digitally mixed for output as the mixed digital audio signal.

Systems, articles of manufacture and program storage devices corresponding to the above-summarized processing facilities are also described and claimed herein.

Advantageously, in one embodiment the present invention provides an ability to send a second stream of digital audio data to an audio decoder for processing by its internal digital signal processor, e.g., using a second "clip mode" type interface such as that described in the above-incorporated application entitled "Method To Play Audio And Video Clips Through MPEG Decoders." As a result, the audio decoder can simultaneously receive a stream through either its transport interface or a first clip mode interface and also through a second clip mode interface. One application might be to send pulse code modulated (PCM) uncompressed data through the second interface for resampling and weighted mixing with the audio stream being decoded and played through the primary interface. Note, however, there are no direct restrictions on the type of data that is input through the first or second interface. Any streaming content could be sent that is within the processing power of the available digital signal processor (DSP). This can be extended to other compressed data types, and even non-audio content for DSP processing (e.g., software modem) in parallel with the primary audio stream if there are enough cycles available to handle two real time tasks.

As a further advantage, an audio decoder in accordance with the present invention provides multichannel output. This might entail a front left-right pair, a rear left-right pair, and a center or surround channel. Often, audio applications only require a subset of the possible channels (simple stereo). Since the output channels are under the DSP control, in the case of mixed audio streams one set of stereo channels might be used for the mixed, or composite stream, for example, for direct playback to a user, while the other stereo channel can be used for output of the original unmixed digital audio data, for example, for recording on a VCR or other device. In this manner, message overlays can be heard on the live broadcast, but not recorded for future listening.

To restate, provided herein is an audio device, for example, for an integrated set top box design, that is able to receive multiple concurrent input streams for processing simultaneously into a single mixed digital output signal. Further, the audio device, after mixing, for example, a primary digital input stream with one or more secondary input streams, outputs both the original primary stream and the mixed output stream for concurrent storage and playback by separate devices. The input can be received through a transport and/or clip mode interface, decompression of one or more streams of data can occur, as well as resampling of the secondary stream based on a frequency of the primary stream. All of these functions can be accomplished by the digital signal processor.

Prior solutions are implemented either in the analog domain, which requires additional components and may not provide the mixing granularity or the audio output quality of the present invention, or if in the digital domain require additional component parts to implement, which may make the solution more costly to build and more complex to control. A facility in accordance with the present invention can be readily implemented by one skilled in the art within a single chip set top box controller without the addition of any external components.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
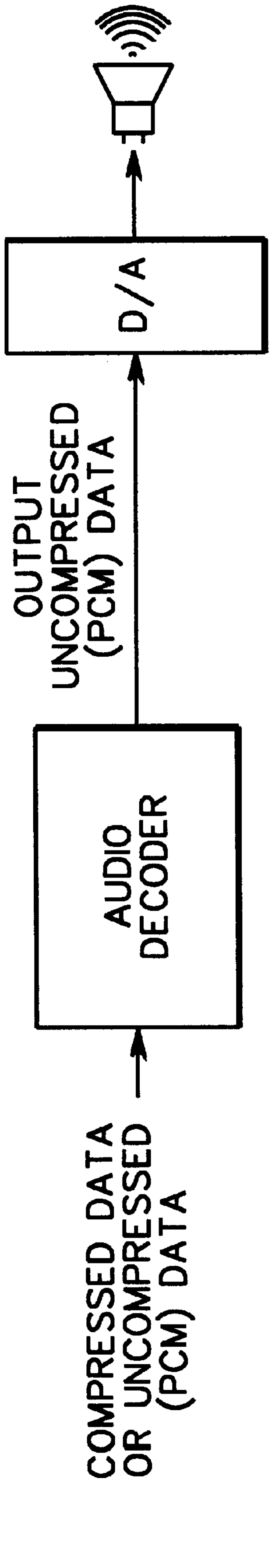
fig. 1 PRIOR ART
FIG. 1 is a block diagram of a prior art audio decode system.

FIG. 1 depicts one embodiment of a conventional audio decode system which employs an audio decoder 10 that receives either compressed data (for example, a stream of MPEG encoded data) or uncompressed, pulse code modulated (PCM) data. Depending on the data type, audio decoder 10 outputs either a decoded stream of data or the uncompressed PCM data to a digital-to-analog converter 12, the output of which drives one or more speakers 14.

As the integration of audio/video decoders and other components of, for example, STB systems onto common silicon progresses, new options become viable. Integration allows greater flexibility in the interconnection of functional units and access to memory, such as a common memory subsystem architecture.

The above-incorporated patent application entitled "Method To Play Audio And Video Clips Through MPEG Decoders" describes a technique for operating a digital data encoder wherein a first stream of encoded data is transmitted to the decoder, and a second stream of encoded data is stored in a memory device. One of the first and second streams of encoded data is selected, and the decoder is used to decode that selected stream of encoded data. The second stream of data could have been placed in the memory device by other devices or processes present in a set top box (STB) system. In such a case, all the decoder needs to process the data is a pointer to the data and some additional information about it, for example, its size. Since the processor has access to all memory, it can do any necessary parsing/manipulation required by the stream format. This provides a large degree of flexibility. The processor can then pass location and attributes of data to the decoder. This also minimizes data movement to/from memory, reducing bandwidth requirements.

As a further extension of the teachings of this patent application, the above-incorporated application entitled "System And Method For Merging Multiple Audio Streams" described a device capable of decoding, as needed, and merging two or more independent digital audio streams using a single base audio decoder circuit. As one example, the application describes an integrated device which employs a direct memory access (DMA)-like control interface that can be used to setup the continuous reading of input files or streams when run dynamically. As data is received in the PCM channel macro, it is buffered, formatted for a digital, serial interface as common in the industry and output using a high speed sample clock that can be provided by one of multiple sources. Since the input format of at least the secondary stream of audio data is assumed to comprise an audio PCM stream, it can be provided as a stored clip, a running PCM stream, or the result of decoding by the host controller, particularly in the case of relatively low complexity compression techniques used for voice-grade audio. The actual mixing of the signals occurs in analog format and digital-to-analog converters are needed to convert the received streams of digital data.

Figure 2:
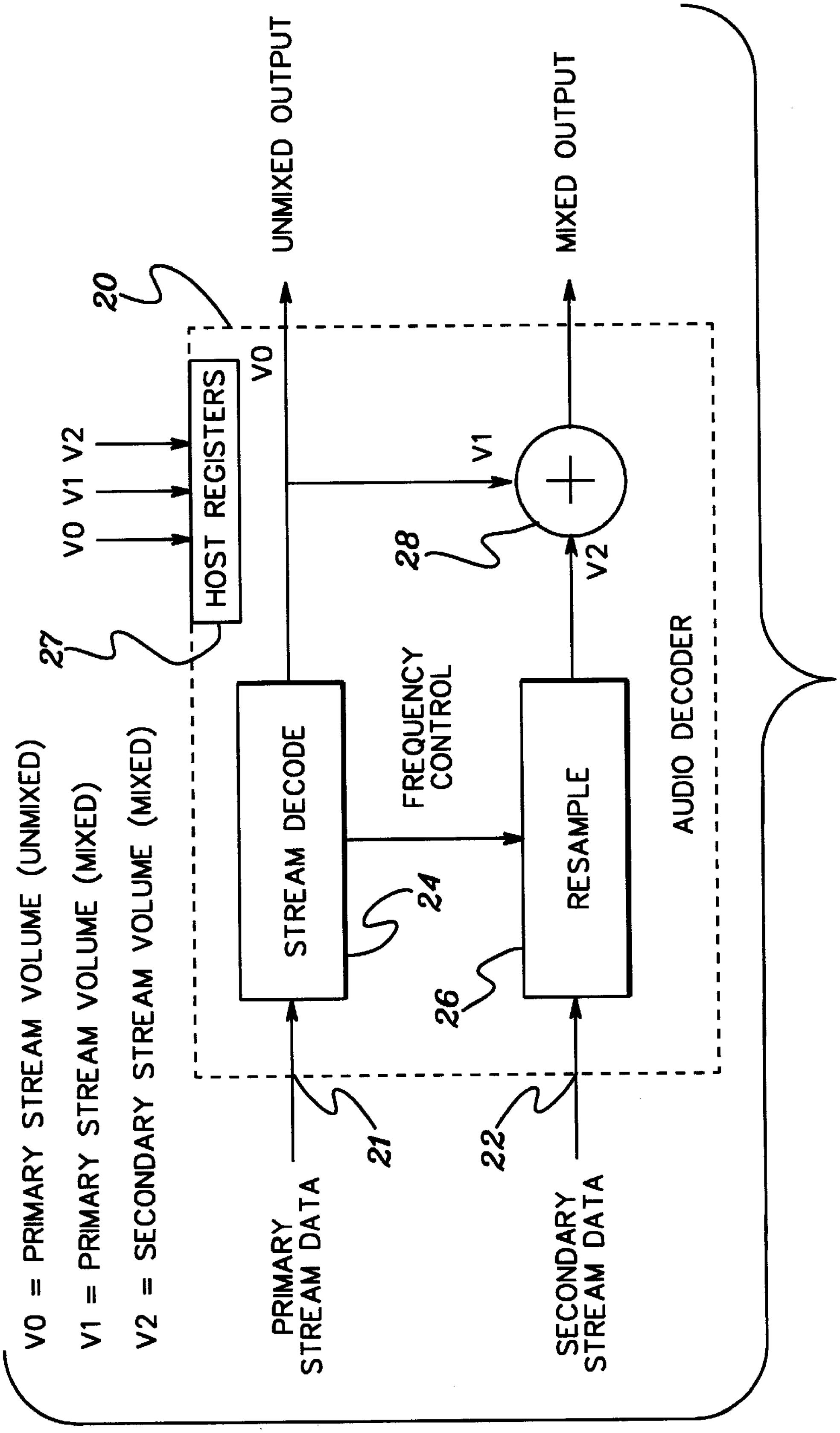
FIG. 2 is a block diagram of one embodiment of an audio decode system implementing a digital processing facility in accordance with the principles of the present invention.

Described and claimed herein are further enhancements on the teachings of the above-incorporated patent applications. More particularly, as shown in FIG. 2, a system in accordance with the principles of the present invention comprises and audio processing system, which in one embodiment may be implemented within an audio decoder, generally denoted 20, for a set top box. In this embodiment, a primary stream of data is received through a first interface 21 into decode system 20 and is assumed to comprise an encoded stream of data. This encoded primary stream of data is decoded by a stream decode capability 24 of the system and the resultant decoded data is output as an unmixed digital audio signal. The stream decode capability is a function well known in the art of audio digital signal processing. For example, the capability resides with an IBM digital set top box integrated controller, part no. STB 01000.

A secondary stream of audio digital data is received through a second interface 22 and in this embodiment, undergoes resampling 26. The resampling logic 26 also receives as input a frequency control signal derived from the sample frequency of the primary stream of digital data. This redigitization function, wherein a second stream of audio digital data is resampled to a sample rate of a first stream of audio digital data, is well known in the art. For example, reference a MacMillian Publishing textbook by J. Proakis and D. Manolakis entitled *Digital Signal Processing Principles, Algorithms and Applications*, second edition, pp. 761–768 (1992) (ISBN 0-02-396815-x). Note that if the secondary stream of audio digital data has the same sampling rate as the primary stream of digital audio data, then no resampling is necessary.

In this embodiment, the processing system further includes host registers 27 for holding, for example, user programmable volume levels for use in outputting the unmixed digital audio signal and weighting the components of the mixed digital audio signal. These volume levels, labeled V0, V1 and V2, may be user controlled through a host processor, not shown.

In one embodiment, the audio processing system has no visibility to stream parameters (i.e., sample rate, PCM sample width, number of audio channels, etc.) defining the secondary stream of digital data to be mixed with the primary stream of data being processed. The user therefore specifies the desired mixing volume associated with the secondary stream to be mixed. The desired effect may be for the primary stream to have a higher amplitude than the secondary stream, or be equal in volume, or for the secondary stream to have a higher amplitude than the primary stream. Controls and support are preferably in place to allow and define these requirements to the audio processing system. The following are input controls which may be employed to specify to the audio digital signal processor how to mix the secondary stream with a primary stream:

MIX_VOL—mixing volume. Controls attenuation of mixed PCM data.

MIX_CH—number of channels in the secondary mixing stream (usually stereo or mono).

MIX_WD—secondary stream PCM sample width.

MIX_FS—secondary stream PCM sampling frequency.

Once the desired parameters are specified to the audio decode system, the system can accept the two separate audio streams of digital data, process them simultaneously, and present both unmixed and mixed outputs, for example, to digital-to-analog converters for driving one or more sets of speakers. The mixing function, labeled 28 in FIG. 2, thus receives as input the secondary stream of data, resampled if necessary and having a user specified volume V2, and the decoded primary stream of data, again having a specified weighting volume V1. The volume levels are compared, and possibly ramped (e.g., through host software), to obtain a desired output volume level for the mixed digital audio signal. Ramping allows for the mean average power to remain constant notwithstanding variations in the weighted volume levels of the primary and secondary audio streams. Mixing of digital audio signals is well established in the art, for example, U.S. Pat. No. 5,963,153, the entirety of which is incorporated herein by reference.

Since many of today's audio digital decoders are capable of multichannel output, i.e., more than two channel (left/right) output, it is possible to output both the mixed digital audio signal and one of the non-mixed digital audio signals simultaneously on separate channel outputs. For example, both the decoded primary stream of digital audio data and the mixed digital audio signal can be output simultaneously in accordance with the present invention. The advantage of being able to present both mixed and non-mixed output simultaneously is that the mixed audio output, for example, may be played to a display screen or television, while the non-mixed audio output is presented to a recording device, such as a video cassette recorder. Thus, message overlays can be heard on a live broadcast, but not recorded for future listening.

Figure 3:
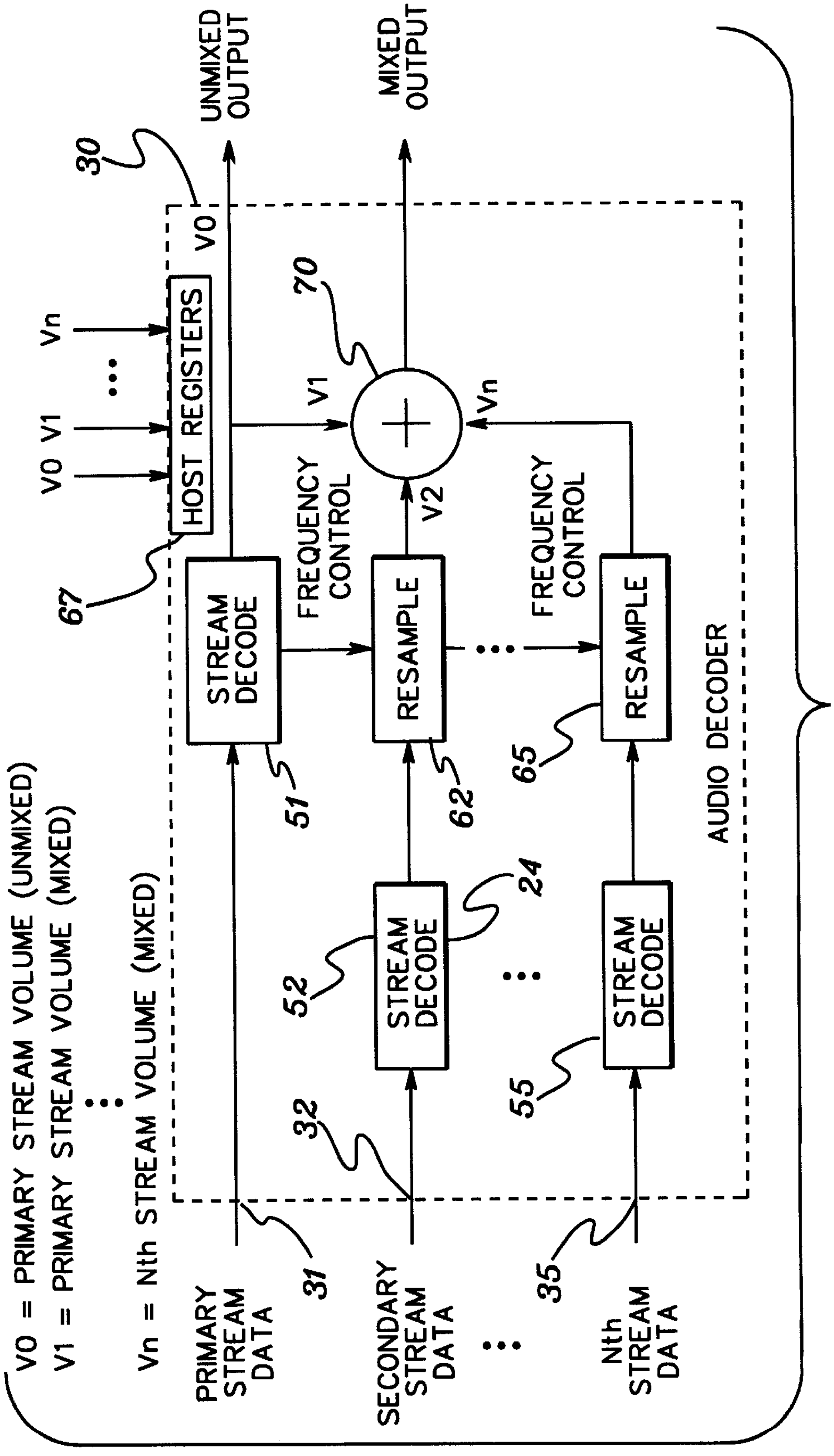
FIG. 3 is a block diagram of an alternate embodiment of a digital decode system implementing a digital processing facility in accordance with the principles of the present invention.

FIG. 3 presents an alternate embodiment of the present invention wherein a decode processing system 30 receives N streams of digital audio data for processing. A primary stream of data is received through a first interface 31, a secondary stream through a second interface 32 and an $N^{th}$ stream of digital audio data through an $N^{th}$ interface 35. In this embodiment, each stream of digital audio data is assumed to be encoded and therefore first undergoes stream decoding 51, 52 . . . 55. If one or more of the secondary stream of digital audio data through the $N^{th}$ stream of digital audio data is sampled at a different frequency than the primary stream of data, then resampling 62 . . . 65 occurs based on a sample frequency derived from the primary stream of data. The resultant signals are then mixed together to produce the mixed digital audio signal to be output from the processing system. Volume for each signal can be independently weighted through appropriate fields in host registers 67. Again, both an unmixed output, for example, comprising the decoded primary stream of digital audio data, and a mixed output are provided. In one embodiment, these different outputs might drive different channels of a multichannel audio system.

Figure 4:
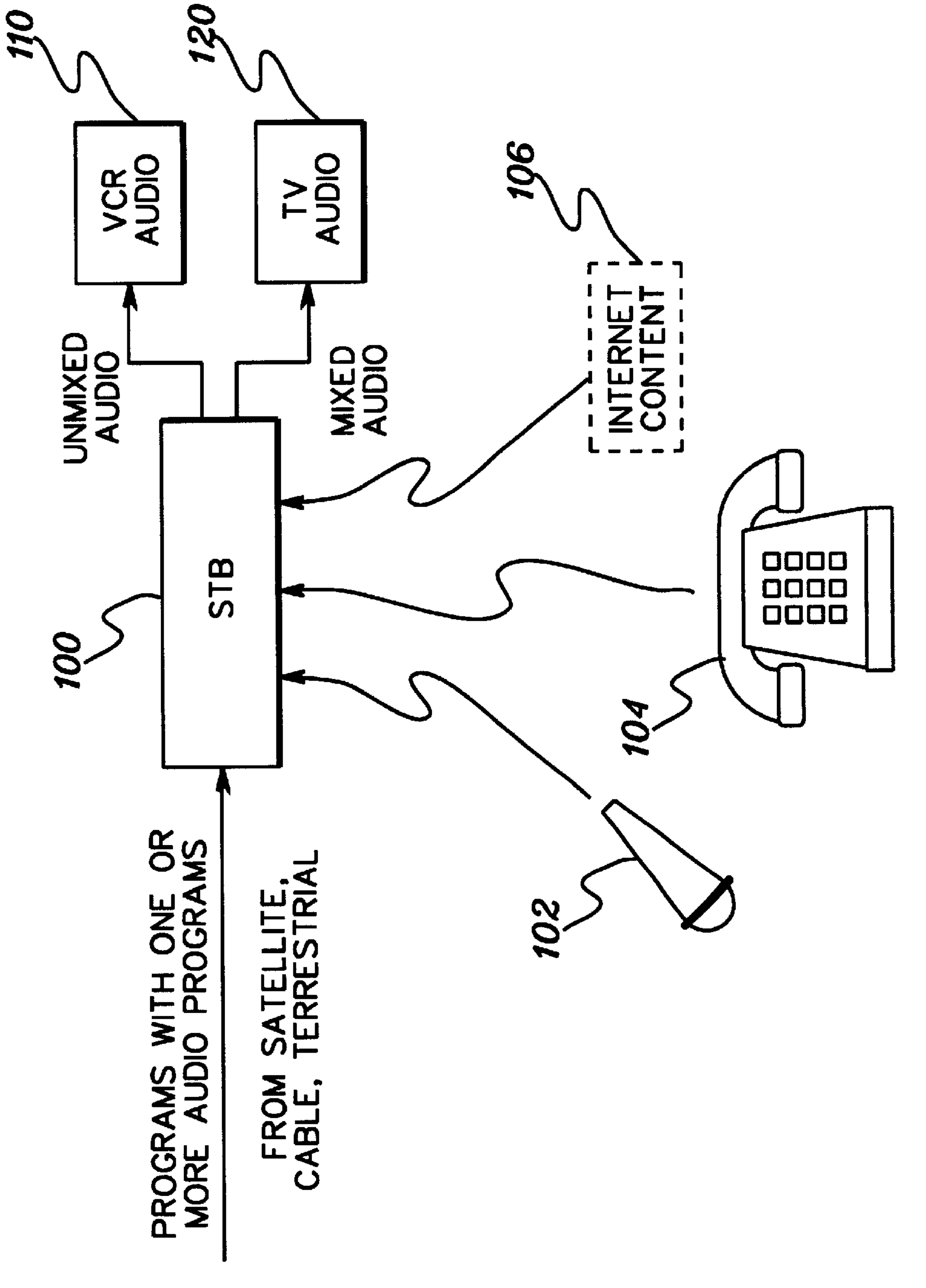
FIG. 4 is a block diagram of one embodiment of a set top box system to implement a digital processing facility in accordance with the present invention, wherein multiple digital audio inputs are received for digital mixing and output as a mixed digital signal simultaneous with outputting of a primary, unmixed audio signal.

FIG. 4 depicts one embodiment of a set top box (STB) 100 to employ audio processing in accordance with the present invention. Since multiple input streams of digital audio data may be received, STB 100 may receive input from programs with one or more audio signals, for example, through satellite, cable or terrestrial modes, a microphone input 102, a telephone input 104 and/or internet derived audio data 106. These multiple inputs are then employed as described above to generate for concurrent output both an unmixed audio signal, for example for forwarding to a video cassette recorder (VCR) 110, and a mixed audio signal, for output, e.g., through a set of speakers or a television set 120.

Figure 5:
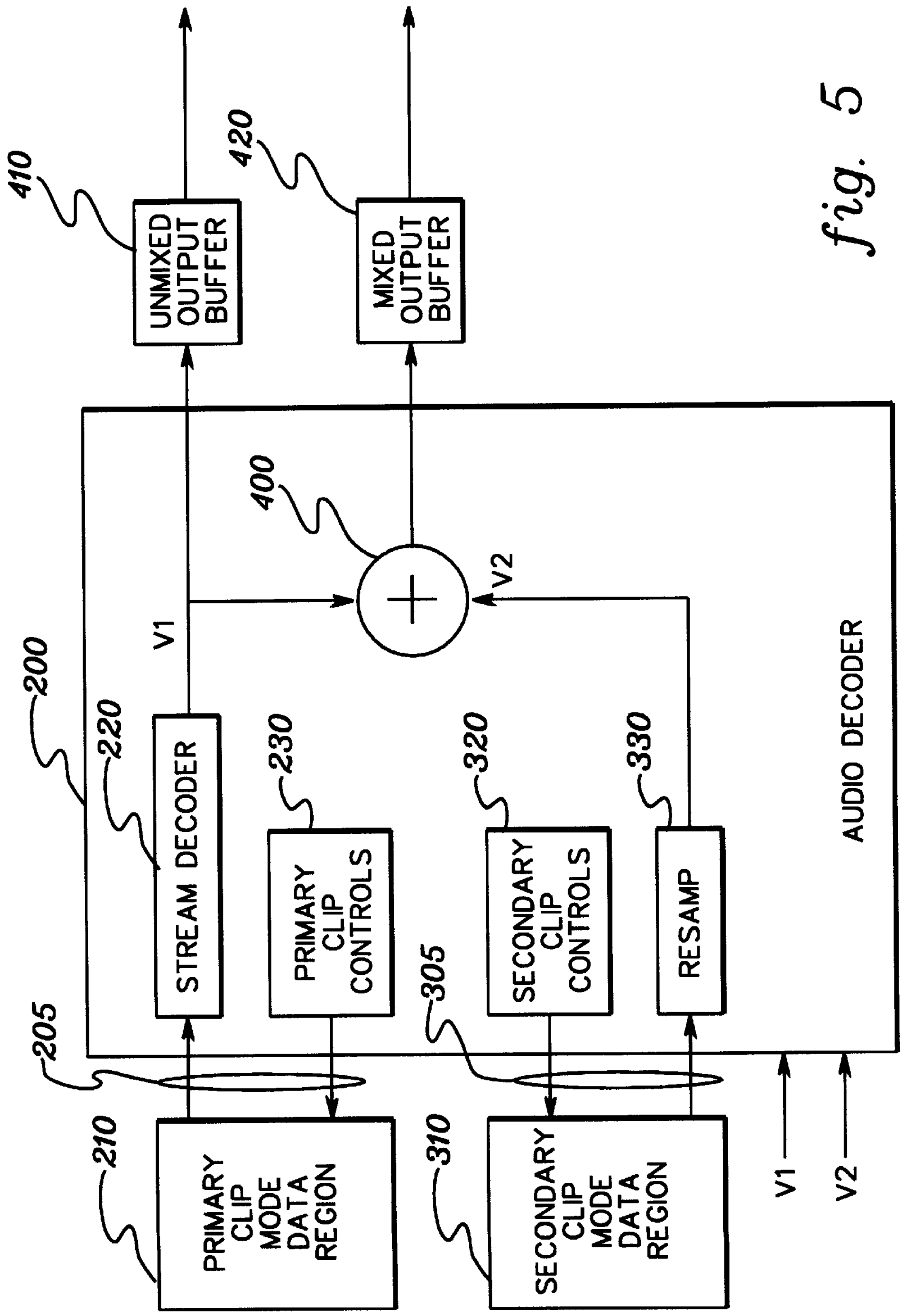
FIG. 5 is a block diagram of one embodiment of an audio decode system employing multiple clip mode interfaces for receiving multiple streams of digital audio data for processing in accordance with the principles of the present invention.

FIG. 5 presents an extension of the above-incorporated patent application entitled "Method To Play Audio And Video Clips Through MPEG Decoders." In this embodiment, the primary stream of digital audio data and the secondary stream of digital audio data are retrieved from memory as clips of data by audio decoder 200. The memory includes a primary clip mode data region 210 and a secondary clip mode data region 310 which are interfaced with audio decoder 200 through dedicated clip mode interfaces 205 & 305, respectively. Clip controls, such as described in the above-referenced application, enable retrieval of the desired clips of primary stream and secondary stream digital audio data. The primary clip controls 230 and secondary clip controls 320 can be generated by the digital signal processor within audio decoder 200. Primary clip controls 230 and secondary clip controls 320 are externally loaded into audio decoder 200 for use in retrieving the primary stream of digital audio data and the secondary stream of digital audio data from the memory described above. The primary clip controls present data to a stream decoder 220 as needed. Again, the primary stream of digital audio data is assumed to be encoded in this example. Further, resampling 330 of the secondary stream of digital audio data can occur based upon a sample frequency derived from the primary stream as described above. The resample function pre-processes the incoming secondary stream, for example, PCM audio data, to align the PCM data with the decoded output PCM data of the primary stream. This again involves creating or deleting audio samples in the incoming secondary stream and smoothing the result to eliminate potential audio artifacts. The secondary stream must contain the same number of PCM samples per second as the primary decoded PCM audio data, i.e., both must be at the same audio sample rate, in order to allow digital mixing.

In addition to being fed to an unmixed output buffer 410 the output of stream decoder 220 is also forwarded to a digital mixer 400 for combining with the output of resample logic 330.

A set of host registers will control the PCM mixing feature, much like the interface for the primary and secondary clip modes. Control register support for PCM mixing can include the following facilities: QAR2, QLR2, WAR2, WLR2, Block Valid2, Stream Busy2, and End of Clip2 bits. These facilities are similar to the controls for the primary clip mode, with the exception of the End of Clip2 bit.

QAR2—Contains the memory address of the start of the next audio clip containing data to be mixed.

QLR2—Contains the length of the next audio clip to be processed.

WAR2—Contains the current memory address of the current audio clip being played. This address will be somewhere between the beginning and the end of the address region of the current clip being processed.

WLR2—Contains the current length remaining of the current audio clip being processed by the audio decoder.

Block Valid2—Indicates if a queued clip is waiting to be processed in the QAR2 and QLR2 fields as soon as the current audio clip has completed.

Stream Busy2—Indicates a secondary audio clip is being processed by the audio decoder.

End of Clip2—Used to indicate that the secondary audio clip stream is coming to an end and the audio decoder should begin to ramp down the intensity of the secondary audio clip to avoid audio artifacts and provide a smooth transition to the primary stream playback only.

Using the above information, digital mixer 400 averages together the PCM samples of each audio stream using an appropriate weighting to create the desired mixed audio effect, which is then output to a mixed output buffer 420. Weighting of the PCM samples can be adjusted using volume values V1 & V2 which may be input, for example, by a host processor or a user. Essentially, volume levels V1 & V2 control ramping of the PCM samples relative to each other for output as the mixed digital audio signal. (V1 and V2 are user controlled parameters which determine the appropriate weight to be applied to each audio component.) The unmixed and mixed output buffers present the audio data to output digital-to-analog converters (not shown), and subsequently to the output speakers. Again, the unmixed digital audio signal is output simultaneous with the mixed digital audio signal as described above.

To summarize, provided herein is an audio device, for example, for an integrated set top box design, that is able to receive multiple concurrent input streams for processing simultaneously into a single mixed digital output signal. Further, the audio device, after mixing, for example, a primary digital input stream with one or more secondary input streams, outputs both the original primary stream and the mixed output stream for concurrent storage and playback by separate devices. The input can be received through a transport and/or clip mode interface, decompression of one or more streams of data can occur, as well as resampling of the secondary stream based on a frequency of the primary stream. All of these functions can be accomplished by the digital signal processor of, for example, a digital audio decoder.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The drawings depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for processing digital audio data, said method comprising:

receiving a first stream of digital audio data from a first audio source and a second stream of digital audio data from a second audio source, wherein said first audio source and said second audio source comprise separate and independent audio sources;

outputting the first stream of digital audio data as an unmixed digital audio signal;

digitally mixing the first stream of digital audio data and the second stream of digital audio data and outputting based thereon a mixed digital audio signal, wherein said mixed digital audio signal is output concurrent with output of said unmixed digital audio signal; and resampling said second stream of digital audio data based on a sample frequency of said first stream of digital audio data when a sample frequency of said second stream differs from the sample frequency of said first stream.

2. The method of claim 1, wherein said receiving comprises concurrently receiving said first and second streams of digital audio data through dedicated real time interfaces.

3. The method of claim 1, further comprising implementing said method by a signal processor of an audio decoder, and wherein said method further comprises decoding at least one of the first stream of digital audio data and the second stream of digital audio data prior to said digitally mixing.

4. The method of claim 3, wherein said decoding comprises decoding the second stream of digital audio data prior to resampling thereof based on a sample frequency of the first stream of digital audio data.

5. The method of claim 1, further comprising setting a first volume of the first stream of digital audio data and a second volume of the second stream of digital audio data to be digitally mixed.

6. The method of claim 5, wherein said digitally mixing comprises ramping the first volume of the first stream of digital audio data and the second volume of the second stream of digital audio data, wherein the mixed digital audio signal comprises an operator controlled volume.

7. The method of claim 6, wherein said outputting of said unmixed digital audio signal comprises outputting said first stream of digital audio data to an unmixed output buffer for forwarding to a recording device, and wherein said concurrent outputting of said mixed digital audio signal comprises outputting said mixed digital audio signal to a mixed output buffer for driving at least one speaker.

8. The method of claim 6, further comprising implementing said method within an audio decoder of a set top box.

9. The method of claim 6, further comprising setting an output volume of said unmixed stream of digital audio data, wherein said output volume can comprise a different volume than said first volume of the first stream of digital audio data to be digitally mixed with the second stream of digital audio data.

10. The method of claim 1, further comprising concurrently retrieving the first stream of digital audio data and the second stream of digital audio data from a memory medium, wherein the first stream of digital audio data and the second stream of digital audio data each have a starting address and a set length within said memory medium.

11. The method of claim 10, wherein said concurrently retrieving comprises employing primary clip controls to retrieve the first stream of digital audio data and simultaneously employing separate, secondary clip controls to retrieve the second stream of digital audio data.

12. The method of claim 11, wherein said concurrently retrieving comprises retrieving the first stream of digital audio data through a first clip mode interface, and retrieving the second stream of digital audio data through a second clip mode interface.

13. The method of claim 11, further comprising implementing said method by a signal processor of an audio decoder, and wherein said primary clip controls and secondary clip controls are externally loaded into said audio decoder for use in retrieving the first stream of digital audio data and the second stream of digital audio data from said memory medium.

14. The method of claim 1, wherein said outputting of the first stream of digital audio data comprises outputting said unmixed digital audio data to an unmixed output buffer, and wherein said outputting of said mixed digital audio signal comprises simultaneously outputting said mixed digital audio signal to a mixed output buffer.

15. The method of claim 1, wherein said outputting of the first stream of digital audio data comprises outputting the first stream of digital audio data to drive at least one first speaker, and said outputting of the mixed digital audio signal comprises simultaneously outputting the mixed digital audio signal to drive at least one second speaker, wherein the at least one first and at least one second speakers reside in a common area and wherein said unmixed digital audio signal and said mixed digital audio signal are simultaneously audible within the common area.

16. The method of claim 1, further comprising receiving n additional streams of digital audio data, wherein $n^{3}1$, and wherein said digitally mixing comprises digitally mixing the first stream of digital audio data, the second stream of digital audio data and the n additional streams of digital audio data and outputting based thereon said mixed digital audio signal.

17. A system for processing digital audio data, said system comprising:

means for receiving a first stream of digital audio data from a first audio source and a second stream of digital audio data from a second audio source, wherein said first audio source and said second audio source comprise separate and independent audio sources;

means for outputting the first stream of digital audio data as an unmixed digital audio signal;

means for digitally mixing the first stream of digital audio data and the second stream of digital audio data and outputting based thereon a mixed digital audio signal, wherein said mixed digital audio signal is output concurrent with output of said unmixed digital audio signal; and means for resampling said second stream of digital audio data based on a sample frequency of said first stream of digital audio data when a sample frequency of said second stream differs from the sample frequency of said first stream.

18. The system of claim 17, wherein said means for receiving comprises means for concurrently receiving said first and second streams of digital audio data through dedicated real time interfaces.

19. The system of claim 17, wherein said system comprises a signal processor of an audio decoder, and wherein said system further comprises means for decoding at least one of the first stream of digital audio data and the second stream of digital audio data prior to said digitally mixing.

20. The system of claim 19, wherein said means for decoding comprises means for decoding the second stream of digital audio data prior to resampling thereof based on a sample frequency of the first stream of digital audio data.

21. The system of claim 17, further comprising means for setting a first volume of the first stream of digital audio data and a second volume of the second stream of digital audio data to be digitally mixed.

22. The system of claim 21, wherein said means for digitally mixing comprises means for ramping the first volume of the first stream of digital audio data and the second volume of the second stream of digital audio data, wherein the mixed digital audio signal comprises an operator controlled volume.

23. The system of claim 22, wherein said means for outputting of said unmixed digital audio signal comprises means for outputting said first stream of digital audio data to an unmixed output buffer for forwarding to a recording device, and wherein said means for concurrent outputting of said mixed digital audio signal comprises means for outputting said mixed digital audio signal to a mixed output buffer for driving at least one speaker.

24. The system of claim 22, further comprising means for implementing said system within an audio decoder of a set top box.

25. The system of claim 22, further comprising means for setting an output volume of said unmixed stream of digital audio data, wherein said output volume can comprise a different volume than said first volume of the first stream of digital audio data to be digitally mixed with the second stream of digital audio data.

26. The system of claim 17, further comprising means for concurrently retrieving the first stream of digital audio data and the second stream of digital audio data from a memory medium, wherein the first stream of digital audio data and the second stream of digital audio data each have a starting address and a set length within said memory medium.

27. The system of claim 26, wherein said means for concurrently retrieving comprises means for employing primary clip controls to retrieve the first stream of digital audio data and simultaneously employing separate, secondary clip controls to retrieve the second stream of digital audio data.

28. The system of claim 27, wherein said means for concurrently retrieving comprises means for retrieving the first stream of digital audio data through a first clip mode interface, and for retrieving the second stream of digital audio data through a second clip mode interface.

29. The system of claim 27, wherein said system comprises a signal processor of an audio decoder, and wherein said primary clip controls and secondary clip controls are externally loaded into said audio decoder for use in retrieving the first stream of digital audio data and the second stream of digital audio data from said memory medium.

30. The system of claim 17, wherein said means for outputting of the first stream of digital audio data comprises means for outputting said unmixed digital audio data to an unmixed output buffer, and wherein said means for outputting of said mixed digital audio signal comprises means for simultaneously outputting said mixed digital audio signal to a mixed output buffer.

31. The system of claim 17, wherein said means for outputting of the first stream of digital audio data comprises means for outputting the first stream of digital audio data to drive at least one first speaker, and said means for outputting of the mixed digital audio signal comprises means for simultaneously outputting the mixed digital audio signal to drive at least one second speaker, wherein the at least one first and at least one second speakers reside in a common area and wherein said unmixed digital audio signal and said mixed digital audio signal are simultaneously audible within the common area.

32. The system of claim 17, further comprising means for receiving n additional streams of digital audio data, wherein $n^3 1$, and wherein said means for digitally mixing comprises means for digitally mixing the first stream of digital audio data, the second stream of digital audio data and the n additional streams of digital audio data and for outputting based thereon said mixed digital audio signal.

33. A system for processing digital audio data, said system comprising:

an audio digital signal processor adapted to receive a first stream of digital audio data from a first audio source and a second stream of digital audio data from a second audio source, wherein said first audio source and said second audio source comprise separate and independent audio sources, and output therefrom the first stream of digital audio data as an unmixed digital audio signal;

wherein the audio digital signal processor is further adapted to digitally mix the first stream of digital audio data and the second stream of digital audio data and output based thereon a mixed digital audio signal, wherein the mixed digital audio signal is output concurrent with output of the unmixed digital audio signal; and wherein the audio digital signal processor is further adapted to resample said second stream of digital audio data based on a sample frequency of said first stream of digital audio data when a sample frequency of said second stream differs from the sample frequency of said first stream.

34. At least one program storage device readable by a machine, tangibly embodying at least one program of instructions executable by the machine to perform a method for processing digital audio data, said method comprising:

receiving a first stream of digital audio data from a first audio source and a second stream of digital audio data from a second audio source wherein said first audio source and said second audio source comprise separate and independent audio sources;

outputting the first stream of digital audio data as an unmixed digital audio signal;

digitally mixing the first stream of digital audio data and the second stream of digital audio data and outputting based thereon a mixed digital audio signal, wherein said mixed digital audio signal is output concurrent with output of said unmixed digital audio signal; and resampling said second stream of digital audio data based on a sample frequency of said first stream of digital audio data when a sample frequency of said second stream differs from the sample frequency of said first stream.

35. The at least one program storage device of claim 34, wherein said receiving comprises concurrently receiving said first and second streams of digital audio data through dedicated real time interfaces.

36. The at least one program storage device of claim 34, further comprising implementing said method by a signal processor of an audio decoder, and wherein said method further comprises decoding at least one of the first stream of digital audio data and the second stream of digital audio data prior to said digitally mixing.

37. The at least one program storage device of claim 36, wherein said decoding comprises decoding the second stream of digital audio data prior to resampling thereof based on a sample frequency of the first stream of digital audio data.

38. The at least one program storage device of claim 34, further comprising setting a first volume of the first stream of digital audio data and a second volume of the second stream of digital audio data to be digitally mixed.

39. The at least one program storage device of claim 38, wherein said digitally mixing comprises ramping the first volume of the first stream of digital audio data and the second volume of the second stream of digital audio data, wherein the mixed digital audio signal comprises an operator controlled volume.

40. The at least one program storage device of claim 39, wherein said outputting of said unmixed digital audio signal comprises outputting said first stream of digital audio data to an unmixed output buffer for forwarding to a recording device, and wherein said concurrent outputting of said mixed digital audio signal comprises outputting said mixed digital audio signal to a mixed output buffer for driving at least one speaker.

41. The at least one program storage device of claim 39, further comprising implementing said method within an audio decoder of a set top box.

42. The at least one program storage device of claim 39, further comprising setting an output volume of said unmixed stream of digital audio data, wherein said output volume can comprise a different volume than said first volume of the first stream of digital audio data to be digitally mixed with the second stream of digital audio data.

43. The at least one program storage device of claim 34, further comprising concurrently retrieving the first stream of digital audio data and the second stream of digital audio data from a memory medium, wherein the first stream of digital audio data and the second stream of digital audio data each have a starting address and a set length within said memory medium.

44. The at least one program storage device of claim 43, wherein said concurrently retrieving comprises employing primary clip controls to retrieve the first stream of digital audio data and simultaneously employing separate, secondary clip controls to retrieve the second stream of digital audio data.

45. The at least one program storage device of claim 44, wherein said concurrently retrieving comprises retrieving the first stream of digital audio data through a first clip mode interface, and retrieving the second stream of digital audio data through a second clip mode interface.

46. The at least one program storage device of claim 44, further comprising implementing said method by a signal processor of an audio decoder, and wherein said primary clip controls and secondary clip controls are externally loaded into said audio decoder for use in retrieving the first stream of digital audio data and the second stream of digital audio data from said memory medium.

47. The at least one program storage device of claim 34, wherein said outputting of the first stream of digital audio data comprises outputting said unmixed digital audio data to an unmixed output buffer, and wherein said outputting of said mixed digital audio signal comprises simultaneously outputting said mixed digital audio signal to a mixed output buffer.

48. The at least one program storage device of claim 34, wherein said outputting of the first stream of digital audio data comprises outputting the first stream of digital audio data to drive at least one first speaker, and said outputting of the mixed digital audio signal comprises simultaneously outputting the mixed digital audio signal to drive at least one second speaker, wherein the at least one first and at least one second speakers reside in a common area and wherein said unmixed digital audio signal and said mixed digital audio signal are simultaneously audible within the common area.

49. The at least one program storage device of claim 34, further comprising receiving n additional streams of digital audio data, wherein $n^{3}1$, and wherein said digitally mixing comprises digitally mixing the first stream of digital audio data, the second stream of digital audio data and the n additional streams of digital audio data and outputting based thereon said mixed digital audio signal.

* * * * *